A. V. VAN HOEVENBERGH.
Domestic Boiler.
No. 20,009.
Patented April 20, 1858.
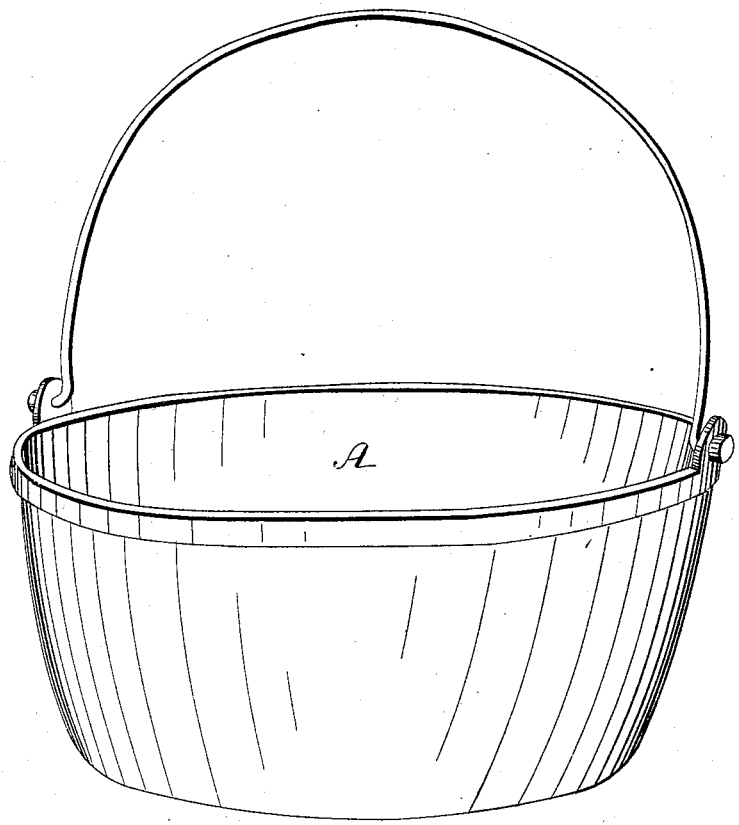
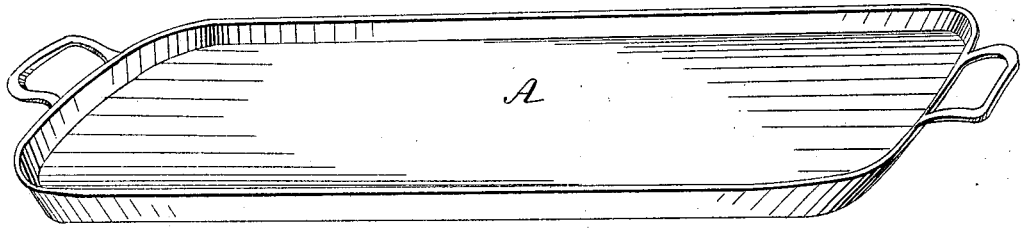

UNITED STATES PATENT OFFICE.

ADAM V. VAN HOEVENBERGH, OF SOUTHSIDE, NEW YORK.

HOLLOW CAST-IRON COOKING UTENSIL.

Specification of Letters Patent No. 20,009, dated April 20, 1858.

*To all whom it may concern:*

Be it known that I, ADAM V. VAN HOEVENBERGH, of Southside, in the county of Richmond, in the State of New York, have invented a new and useful Improvement in Metal Culinary Vessel or Vessels Used in Cooking; and I do hereby declare that the following is a full and exact description thereof.

The nature of my invention consists in providing cooking vessels for boiling, baking and frying with a polished inner surface or surface with which the substance to be boiled, baked or fried is to come in contact, and by this means to obviate smoke or burning or other consequences of imperfect cooking or cooking upon an unequal surface.

In order that others skilled in the art may be enabled to make and use my invention, I proceed to describe the process and mode of operation of my said invention.

This process consists in applying to the inner surface or surface with which the substance to be cooked is to come in contact of cooking vessels of wrought or cast metal any of the usual and known methods of polishing metals by means of a wheel and lathe or otherwise with emery or other polishing substance and thereby effecting as nearly as possible a perfect equality of surface and by this means attaining an equal application of heat to the whole surface of the substance to be cooked.

What I claim and desire to secure by Letters Patent is—

A new and improved article of manufacture, to wit: hollow cast iron cooking utensils, kettles, griddles, etc., having the interior surface which comes in contact with the cooking material polished by any of the usual processes for polishing metals.

ADAM V. VAN HOEVENBERGH.

Witnesses:
CHAS. N. NICHOLS,
JAMES T. WELSH.